*Inventors*
SOLOMON E. KAY
JOHN B. BOUCHER

United States Patent Office 3,549,466
Patented Dec. 22, 1970

3,549,466
LAMINATED TRANSPARENT ASSEMBLIES
WITH PREFORMED METAL FOIL EDGE
SEALING MEANS
Solomon Elijah Kay and John Bradley Boucher, Solihull,
England, assignors to Triplex Safety Glass Company
Limited, London, England, a corporation of Great
Britain
Filed July 14, 1967, Ser. No. 653,561
Claims priority, application Great Britain, Aug. 17, 1966,
36,889/66
Int. Cl. B32b 1/04, 17/06
U.S. Cl. 161—39                              2 Claims

ABSTRACT OF THE DISCLOSURE

A laminated transparent assembly, for example an aircraft window, having glass sheets bonded together by one or more plastics bonding layers, in which the edges of a bonding layer are protected from the deleterious effects of atmospheric gases by a strip of metal foil or metallized plastics tape which seals around the assembly and which is bonded to the peripheral edges of the glass sheets and to the edges of the bonding layers.

BACKGROUND OF THE INVENTION (1) Field of the invention

The present invention relates to laminated transparent assemblies and more particularly to such assemblies intended for use in aircraft in which two or more sheets of glass are bonded together by a bonding layer consisting of one or more sheets of plastics material.

(2) Description of the prior art

It has been found that the edges of the bonding layer are subject to deterioration in use owing to attack by gases present in the atmosphere, for example sulphur dioxide, hydrogen sulphide and water vapour. This deterioration, which impairs the transparency of the marginal areas of the plastics bonding layer, is particularly serious where the plastics bonding layer consists of an organo silicon elastomer, such as is used in the windows of aircraft intended for high speed flight to resist extreme temperature conditions. In the case of organo silicon elastomer this degeneration is accelerated by the effect of ultra-violet radiation present at high altitude.

It is known to protect the edges of the bonding layers of such assemblies by means of organic sealing materials such as glass fibre reinforced tape or synthetic rubbers, but such organic materials are not completely resistant to attacks by deleterious gases.

It is an object of the present invention to provide a laminated transparent assembly in which the bonding layer is more fully protected against the deterioration caused by harmful gases present in the atmosphere than hitherto.

SUMMARY

According to one aspect of the present invention, in laminated transparent assembly including two adjacent glass sheets bonded together by a bonding layer consisting of one or more superposed sheets of plastics material extending over substantially the whole area of the glass sheets, a strip of metal foil or metallised plastics tape extends around the edge faces of the adjacent glass sheets, said strip having longitudinal sections thereof sealed onto the said peripheral edge faces, and a portion of the strip intermediate said sections seals around and is bonded to the edges of the bonding layer.

The strip of metal foil or metallised plastics tape may be sealed to the peripheral edge faces of the glass sheets by a silicone or other suitable adhesive. Preferably however the strip is of metal foil, and this is soldered to a metal coating, such as a silver coating, previously applied to the edge faces of the glass sheets. The metal foil is preferably a tinned lead foil. The metallised plastics tape may consist of thermo-setting adhesive-covered polyester film having an aluminium film deposited thereon.

According to a further aspect of the invention, a method of making a laminated transparent assembly as aforesaid, and in which the edge or edges of a first glass sheet are set back from the overlapping edges of an adjacent second glass sheet, includes the steps of attaching a longitudinal section of the said strip to the edges of the said first sheet, bending the free edge of said strip outwardly so as to be co-planar with a face of the said first glass sheet which face serves as an inner face of the assembly, assembling together the said glass sheets with a layer of plastics bonding material therebetween which layer is of the same peripheral dimensions as the said second glass sheet, subjecting the assembly to elevated temperatures and pressures to cause the plastics bonding material to secure together the glass sheets and also to bond onto a longitudinal portion of the said strip, and finally folding the free longitudinal section of the strip around the edge faces of the second glass sheet and attaching the strip thereto.

DESCRIPTION OF THE PREFERRED
EMBODIMENT

Figure 1:
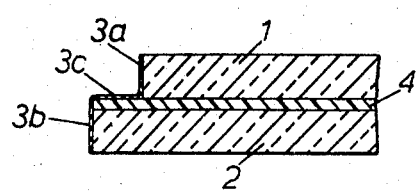
FIG. 1 shows by way of example one form of laminated transparent assembly constructed according to the present invention.

Referring to FIG. 1, the two glass sheets 1 and 2 which it is intended to bond together are cut to size and all edge faces are ground to a fine finish.

Glass sheet 2 is of larger area than glass sheet 1, so that on final assembly the edges of glass sheet 1 are set back from the adjacent overlapping edges of the glass sheet 2.

A liquid metallic coating medium is applied by brush or other means all around the prepared peripheral edge faces of the glass sheets. The metallic coating medium is preferably a suspension of finely divided silver in an organic medium, e.g., an essential oil to which has been added basic metal oxide or other compounds as a flux known to form strong adhesive coatings on glass. The coating is fired into the glass in two stages, by preheating the glass firstly to a temperature of 450° C. for three hours, and subsequently increasing this temperature to 650° C. for five minutes. After this firing the glass sheets may be cooled slowly to room temperature but more usually are rapidly cooled to produce a toughening or strengthening of the glass. After cooling, the edge coating of both glass sheets is tinned with a tin-lead solder containing a small quantity of silver, for example having 60% tin, 38% lead and 2% silver, by the application of a soldering iron around the edge faces.

A piece of tinned lead foil 3 of suitable width and length and having a thickness between 0.003 inch and 0.010 inch is cleaned by a light abrasion of the surface, and tinned with a solder of similar composition to that used for tinning the metallic coating. The metal foil 3 is then wrapped around the edge face of the smaller glass sheet 1, and a longitudinal section 3a thereof is soldered to the edge face of the glass sheet in such a manner that the edge of the foil is flush with the top surface thereof. The glass sheet 1 and metal foil 3 then form the component illustrated in FIG. 2. The metal foil is then slit at each corner, and the free edges are bent outwardly so as to be coplanar with a face of the glass sheet 1 which face is to be an inner face of the assembly.

The glass sheets 1 and 2 are then assembled together with several sheets of organo silicon elastomer therebetween, these sheets having the same peripheral dimensions as the larger glass sheet 2. The assembly is then subjected to the conventional elevated temperatures and pressures employed in the manufacture of laminated assemblies of glass sheets to convert the sheets of elastomer into a bonding layer 4, which layer secures together the glass sheets, and this laminating process also bonds a central longitudinal portion 3c of the metal foil 3 to the surface of the elastomer layer which extends around the glass sheet 1.

In the final stage of manufacture, the free longitudinal section 3b of the metal foil 3 is folded around the edge faces of the glass sheet 2 and is soldered to these edge faces. Small corner pieces of metal foil are soldered into the gaps in the strip formed around the corners of the glass sheet 2 and the elastomer layer 4.

In the laminated assembly so produced, the elastomer 4 provides a bonding layer between the glass sheets 1 and 2 and the metal foil 3 seals around and is bonded to the edges of this layer to give protection against attack by deleterious gases.

Figure 2:
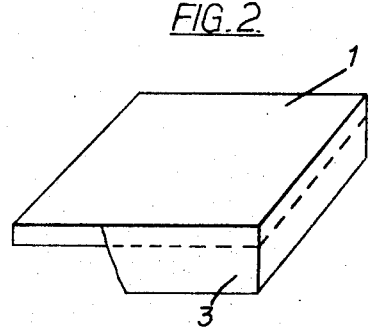
FIG. 2 shows a perspective view of a component of the assembly shown in FIG. 1, and FIGS. 3 and 4 show cross-sections of further examples of laminated transparent assemblies according to the present invention.
Figure 3:
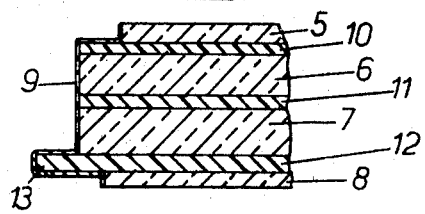

FIG. 3 shows an assembly having four glass sheets 5, 6, 7, and 8, and provided with a metal foil strip 9 for sealing the edges of bonding layers 10, 11, and 12. This assembly is formed by laminating the glass sheets and bonding layers together with the metal foil 9 already attached along one longitudinal section thereof to the sheet 5 generally as described with reference to FIGS. 1 and 2, and subsequently attaching further longitudinal sections of the foil 9 to metal coatings on the edge faces of the sheets 6, 7 and 8. The edge extension 13 of the bonding layer 12, which is sealably enclosed by and bonded to the foil, enables the assembly to be securely located in a frame (not shown).

Figure 4:
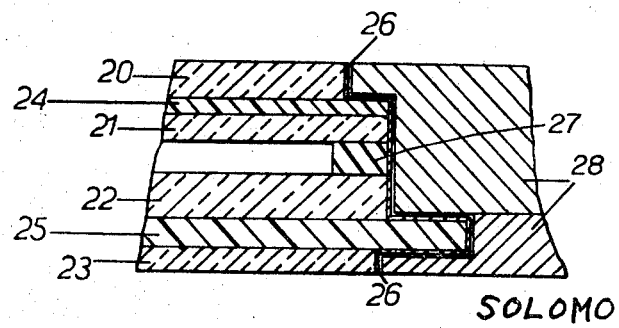

FIG. 4 shows an "air gap" type of panel, having two pairs of adjacent glass sheets 20 ando 21, and 22 and 23, each pair being bonded by bonding layers 24 and 25 respectively, and the sheets 21 and 22 being separated by an air gap. A strip of metal foil 26, in addition to sealing the edges of the bonding layers 24 and 25, also encloses the air gap between the sheets 21 and 22, so that this air gap is thereby sealed against ingress of moisture.

The longitudinal section of the foil 26 which seals the air gap is supported by contact with rubber separating strips 27. The edge extension of the bonding layer 25 again is used to locate the assembly on a frame indicated at 28.

In this construction, the uppermost assembly of glass sheets 20 and 21 may be formed in the same manner as the assembly shown in FIGS. 1 and 2, by providing an extending rim of metal foil for attachment to metallic coatings on the edges of glass sheets 22 and 23.

It is possible to use metal coatings on the glass edge faces of metals other than silver, for example bismuth, tin, or cadmium alloys, but silver is preferred as having a higher melting point and as being more suitable for subsequent soldering of the metal foil. Tinned aluminium foil may be used as an alternative to tinned lead foil.

Some laminated assemblies for aircraft according to this invention may be made with a chemically toughened glass sheet as the innermost sheet. Such glass cannot be subjected to the high temperature process which is required to fire the metal coating as described, and consequently the strip must be attached to such glass by an adhesive, such as a silicone adhesive. The seal provided by such an adhesive is not so chemically resistant as that provided by soldering, but since the chemically toughened glass is most likely to be used as the innermost sheet the seal is normally only exposed to the atmosphere within the aircraft.

As an additional protection, glazing rubbers such as poly-sulphide, silicone or polyurethane rubbers may be applied to the exposed surface of the lead foil.

We claim:
1. A laminated transparent assembly including two transparent sheets of glass bonded together by an intervening bonding layer comprising at least one sheet of plastic material, the edges of one of the glass sheets being set back from the edges of the other glass sheet and the intervening bonding layer having generally the same surface area as said other glass sheet, a solder receptive, adhering coating means applied to the peripheral edges of both of said sheets, and edge sealing material extending around the peripheral edge faces of the glass sheets and the intervening bonding layer, said edge sealing material comprising a preformed strip of metal foil having sections soldered onto said coating means and a portion intermediate the said sections bonded to the otherwise exposed peripheral surfaces of the intervening bonding layer.

2. A laminated transparent assembly according to claim 1, in which the solder receptive adhering coating is a silver coating, which coating is fired into the peripheral edges of the glass sheets at elevated temperatures.

References Cited

UNITED STATES PATENTS

| | | | |
|---|---|---|---|
| 2,235,680 | 3/1941 | Haven et al. | 161—44X |
| 2,457,158 | 12/1948 | Koch | 161—192X |
| 2,537,804 | 1/1951 | Watkins | 156—107X |
| 2,835,623 | 5/1958 | Vincent et al. | 161—44X |
| 2,858,248 | 10/1958 | Hastings III et al. | 161—214X |
| 2,861,022 | 11/1958 | Lundsager | 161—214 |
| 2,999,040 | 9/1961 | Burdick | 161—44 |
| 3,061,490 | 10/1962 | Ryan | 161—44 |
| 3,414,445 | 12/1968 | Orcutt | 161—44X |
| 1,845,133 | 2/1932 | Davis | 161—149 |

JOHN T. GOOLKASIAN, Primary Examiner

D. J. FRITSCH, Assistant Examiner

U.S. Cl. X.R.

161—45, 149, 193, 207; 156—107